Patented Sept. 29, 1942

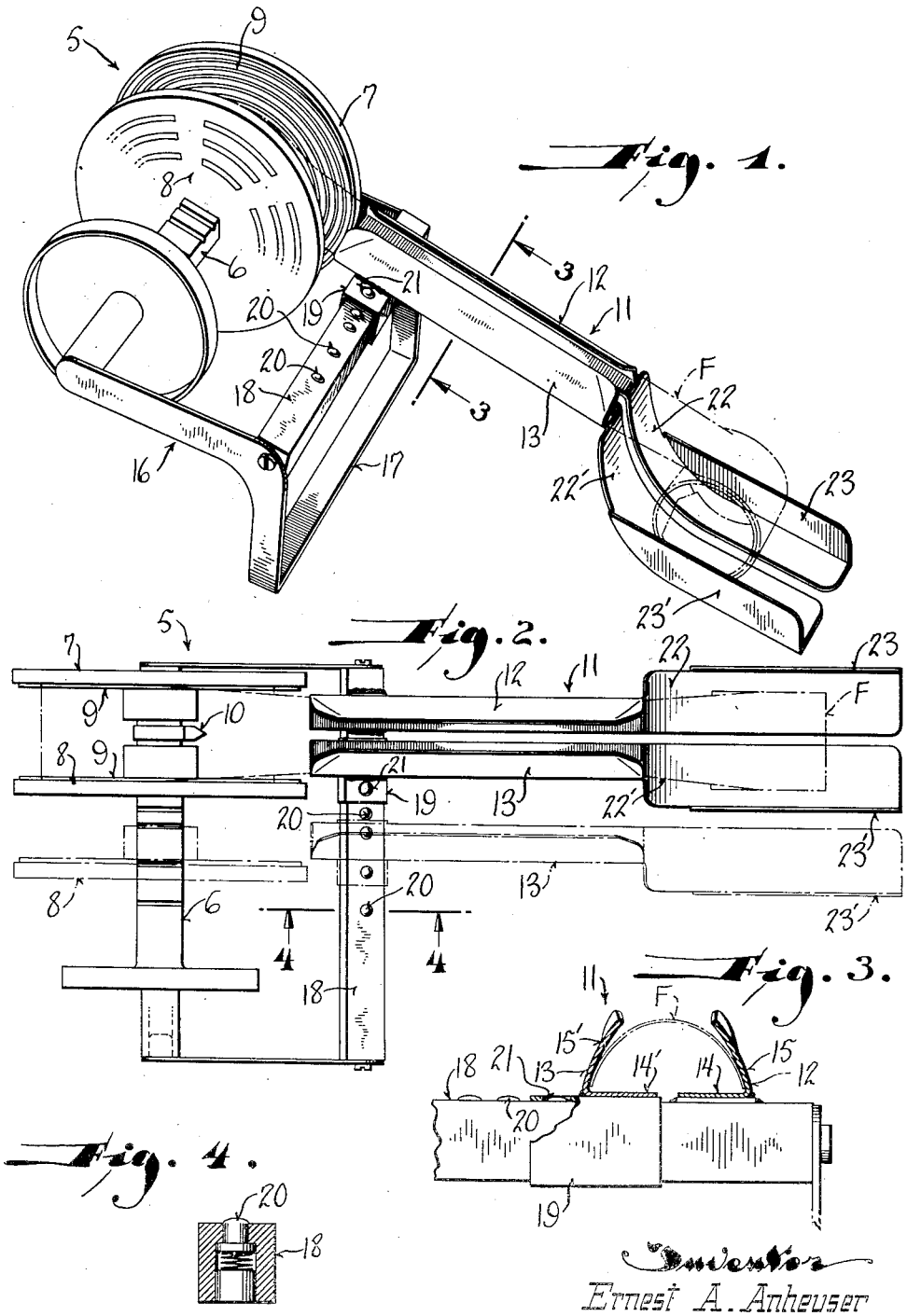

2,297,525

UNITED STATES PATENT OFFICE 2,297,525

FILM GUIDE

Ernest A. Anheuser, Milwaukee, Wis.

Application January 16, 1941, Serial No. 374,609

4 Claims. (Cl. 242—76)

This invention relates to improvements in roll film developing equipment and has as a general object to provide means for facilitating the application of roll film to reels of the type used in film developing tanks as shown in Patent No. 2,151,907, issued March 28, 1939, to Lawrence R. Fink.

These film developing tanks are generally circular, and have a removable cover and a removable spool or reel upon which the film is mounted.

The spool or reel consists of a hub, preferably square or otherwise polygonal in cross section, and a pair of complementary flanges mounted on the hub. One of the flanges is fixed to the hub and the other is slidable along the length thereof to enable adjustment of the spacing between the flanges, suitable means being provided to hold the adjustable flange in any of a number of different locations as determined by the different widths of commercial roll films.

A handle or twirling knob is generally located on one end of the hub and the inner faces of the flanges have spiral film tracks to receive the side edges of the film.

The application of the film to the reel has always been a difficult matter as the spiral tracks are grooves in which the side edges of the film must be engaged. Hence, when the film is wound from the inside out, which is the most satisfactory method, the film must be bowed to permit its insertion between the flanges and this requires some dexterity and too much handling of the film.

An alternative manner of applying the film to the reel is to thread it into the outer end of the spiral grooves and push it onto the spool. This method, however, is even more objectionable because of the increased handling required.

It is, therefore, a specific object of this invention to provide an attachment for use with film reels which materially simplifies the application of the film to the reel and obviates to a great extent handling or touching the film.

Another object of this invention is to provide a film guide which is so designed as to bow the film transversely to a dimension readily receivable between the flanges of a film reel, together with means for holding the guide in proper relationship to the reel.

A further object of this invention is to provide a guide of the character described which is adjustable in width so that it may be used with the various widths of commercial roll film.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates one complete example of the physical embodiment of the invention constructed according to the best mode so far devised for the practical application of the principles thereof, and in which:

Figure 1 is a perspective view illustrating a film guide and reel embodying this invention and showing the manner in which the guide functions in the application of the film to the reel;

Figure 2 is a top plan view of the entire equipment and illustrating in dotted lines the manner in which the guide and reel may be adjusted to accommodate different widths of film;

Figure 3 is a cross sectional view taken on the plane of the line 3—3 in Figure 1; and Figure 4 is a detail sectional view taken through Figure 2 on the plane of the line 4—4.

Referring now particularly to the accompanying drawing, in which like numerals indicate like parts, the numeral 5 designates a film guide of the type for which this invention is designed and which, as stated, comprises a hub 6, a stationary flange 7, and an adjustable flange 8. The latter is slidable along the hub and may be releasably secured in any one of a number of definite positions.

Both flanges have spiral grooves 9 in their inner faces defining film tracks in which the side edges of the film F are received.

The hub 6 also carries a prong or hook 10 to which the end of the film is attached preparatory to its application to the reel.

To facilitate the application of the film to the reel, a guide, indicated generally by the numeral 11, is provided. This guide consists of two similar complementary track forming members 12 and 13 of angular cross section, as shown in Figure 3, so as to have horizontal flanges 14 and 14' and upright flanges 15 and 15'.

The film guide and the reel are supported and held in proper juxtaposition by a bracket-like support, indicated generally by the numeral 16. This support consists of a base 17 having a crossbar and upright arms, the outer ends of which are adapted to rotatably engage the ends of the reel hub 6, engagement and disengagement being effected by spreading the ends of the arms, which are preferably resilient.

Supported between the upright arms in a manner permitting rotation about its axis, is a crossbar or rail 18. This crossbar or rail is substantially parallel with the axis of the reel and is located in juxtaposition to the peripheral edge of the flanges.

The track forming member 12 is fixed to the crossbar or rail by having its horizontal flange 14 soldered or otherwise secured thereto. The other track forming member 13 has its horizontal flange 14' soldered or otherwise fixed to a sleeve 19, slidably mounted on the rail or crossbar.

Hence, one of the track forming members is fixed, and as shown in Figure 2, is opposite the fixed flange 7, while the other track forming member 13 is movable along the length of the reel so that it may be set opposite the adjustable flange 8 at all times.

Spring pressed detents 20, spaced along the length of the crossbar or rail 18 and engaging in a hole or notch 21 in the sleeve 19, adjustably hold the track forming member 13 in any one of a plurality of definite locations properly located with relation to the different positions of adjustment of the flange 8.

At their outer ends the horizontal flanges of the track forming members are extended to form downwardly and outwardly curved supports 22 and 22', the outer ends of which have upstanding flanges 23 and 23' to define a receptacle or pocket for the roll of film being applied to the reel.

In use, the adjustable flange of the reel and the adjustable track forming member of the guide are set to the proper width and then the end of the film is slid along the guide to the reel. The spacing between the track forming members of the guide is such that the film is bowed transversely to an overall width somewhat less than the clearance between the flanges so that the film fits easily between the flanges.

It is then attached to the hook 10 so that by revolving the hub the film is drawn onto the reel. Obviously, the film assumes its full width as it winds up on the spiral tracks of the flanges, and inasmuch as the crossbar or rail 18 is rotatable about its own axis, it is possible to keep the guide tangent with the increasing diameter of the spiral track.

It is also apparent that this manner of applying the film entirely obviates the objectionable handling of the film beyond its initial attachment to the hook 10.

What I claim as my invention is:

1. In combination with a film holding reel of the type used in film developing tanks, and which comprises a hub and a pair of spaced flanges mounted on the hub in a manner enabling adjustment of their spacing, said flanges having spiral film tracks on their inner faces: a guideway along which film may be slid for application to the reel, said guideway comprising complementary tracks adapted to slidably receive the opposite side edges of the film; a supporting rail; means mounting the complementary tracks on the rail for relative translating motion in a direction lengthwise of the rail to enable adjustment of their spacing so that the width of the guideway may be coordinated with the spacing of the reel flanges and set to a width less than that of the film and no greater than the clearance between the flanges to bow the film transversely to an overall width readily receivable between the flanges; a supporting structure carrying said rail; and means on the supporting structure rotatably mounting the reel in position to receive film from the guideway.

2. In combination with a film reel of the type used in film developing tanks and which comprises a hub having a pair of flanges mounted thereon in a manner enabling adjustment of the spacing therebetween, said flanges having spiral film tracks on their inner faces: a bracket-like support freely rotatably supporting the film reel; a crossbar on the support substantially parallel with the axis of the reel and in juxtaposition to the peripheral edges of the flanges; complementary track forming members mounted on said crossbar, said track forming members being adapted to slidably receive the side edges of the film, at least one of said track forming members being adjustable along the cross-bar so that the width of the track may be coordinated with the spacing between the reel flanges; and means for releasably holding the adjustable track forming member in a selected position of adjustment.

3. In combination with a film reel of the type used in film developing tanks and which comprises a hub having a pair of flanges mounted thereon, one of which is fixed while the other is slidable along the hub to enable adjustment of the spacing between the flanges, and said flanges having spiral film receiving tracks on their inner faces: a supporting structure freely rotatably supporting the reel and including a cross-bar substantially parallel with the axis of the reel and in juxtaposition to the peripheral edges of its flanges; a film guiding track comprising two complementary angle members adapted to slidably receive the side edges of the film; means securing one of said film forming members to the crossbar in line with the fixed flange; and means adjustably mounting the other track forming member on the crossbar so as to enable the same to be positioned opposite the adjustable flange to thereby coordinate the width of the track with the spacing between the flanges.

4. In combination with a film reel of the type used in film developing tanks and which comprises a hub having a pair of flanges mounted thereon, one of which is fixed while the other is slidable along the hub to enable adjustment of the spacing between the flanges, and said flanges having spiral film receiving tracks on their inner faces; a supporting structure freely rotatably supporting the reel and including a crossbar substantially parallel with the axis of the reel and in juxtaposition to the peripheral edges of its flanges; a film guiding track comprising two complementary angle members adapted to slidably receive the side edges of the film; means securing one of said film forming members to the crossbar in line with the fixed flange; means adjustably mounting the other track forming member on the crossbar so as to enable the same to be positioned opposite the adjustable flange to thereby coordinate the width of the track with the spacing between the flanges; and means on the outer ends of the track forming members forming a receptacle for a roll of film to be slid along the track to the reel.

ERNEST A. ANHEUSER.